(12) United States Patent
Imaoka

(10) Patent No.: US 9,255,432 B2
(45) Date of Patent: Feb. 9, 2016

(54) SEAL STRUCTURE FOR FIXING WINDOW REGULATOR TO INNER PANEL OF VEHICLE

(71) Applicant: HI-LEX CORPORATION, Takarazuka-shi, Hyogo (JP)

(72) Inventor: Takayuki Imaoka, Takarazuka (JP)

(73) Assignee: HI-LEX CORPORATION, Takarazuka-shi (JP)

(*) Notice: Subject to any disclaimer, the term of this patent is extended or adjusted under 35 U.S.C. 154(b) by 0 days.

(21) Appl. No.: 13/713,274

(22) Filed: Dec. 13, 2012

(65) Prior Publication Data
US 2013/0152714 A1 Jun. 20, 2013

(30) Foreign Application Priority Data

Dec. 15, 2011 (JP) ................. 2011-274916

(51) Int. Cl.
*E05F 11/48* (2006.01)
*F16H 19/06* (2006.01)
*E05F 11/38* (2006.01)
(Continued)

(52) U.S. Cl.
CPC ............ *E05F 11/488* (2013.01); *B60J 5/0468* (2013.01); *E05F 11/382* (2013.01); *E05F 11/385* (2013.01); *E05F 11/481* (2013.01); *E05F 15/689* (2015.01); *F16H 19/0618* (2013.01); *E05Y 2800/12* (2013.01); *Y10T 74/18152* (2015.01)

(58) Field of Classification Search
CPC ..... E05F 11/382; E05F 11/385; E05F 11/481; E05F 11/488; E05F 15/689; B60J 5/0468; F16H 19/0618

USPC ............ 49/348, 349, 352, 483.1, 493.1, 502, 49/372, 374, 375
See application file for complete search history.

(56) References Cited

U.S. PATENT DOCUMENTS

| 2,987,937 | A | * | 6/1961 | Sala ................................ 74/505 |
| 6,560,928 | B2 | * | 5/2003 | Cabanne et al. ................. 49/349 |

(Continued)

FOREIGN PATENT DOCUMENTS

| JP | 2005-042331 A | 2/2005 |
| JP | 2007-177421 A1 | 7/2007 |

OTHER PUBLICATIONS

Japanese Office Action dated May 12, 2015, with English translation-in-part for the corresponding Japanese patent application No. 2011-274916.

*Primary Examiner* — Katherine Mitchell
*Assistant Examiner* — Marcus Menezes
(74) *Attorney, Agent, or Firm* — Kratz, Quintos & Hanson, LLP

(57) ABSTRACT

An object of the present invention is to provide a seal structure being capable of preventing rain water and the like from entering the inside of a vehicle through a clearance between an engagement portion and an engagement hole portion. The seal structure S is for fixing a window regulator WR to an inner panel 1. The inner panel 1 is provided with an engagement hole portion 1H, and the window regulator WR comprises an engagement portion 7 being slidable with respect to the inner panel 1 and engaging with the engagement hole portion 1H, a sealing member 8 provided around the engagement portion 7, and a seal supporting portion 9 holding the sealing member 7 between the seal supporting member 9 and the portion of the inner panel 1 surrounding the engagement hole portion 1H.

10 Claims, 8 Drawing Sheets

(51) Int. Cl.
  *B60J 5/04*    (2006.01)
  *E05F 15/689*  (2015.01)

(56) References Cited

U.S. PATENT DOCUMENTS

| | | | |
|---|---|---|---|
| 6,634,142 B2 * | 10/2003 | Dobson et al. | 49/352 |
| 7,044,412 B2 * | 5/2006 | Hemond et al. | 242/390.8 |
| 7,198,315 B2 * | 4/2007 | Cass et al. | 296/29 |
| 7,591,104 B2 * | 9/2009 | Takeda et al. | 49/352 |
| 7,950,185 B2 * | 5/2011 | Lefevre et al. | 49/352 |
| 2005/0016071 A1 * | 1/2005 | Takeda et al. | 49/352 |
| 2005/0188621 A1 * | 9/2005 | Kinoshita et al. | 49/352 |
| 2007/0144073 A1 * | 6/2007 | Munezane et al. | 49/349 |
| 2008/0229671 A1 | 9/2008 | Takeda et al. | |
| 2013/0227889 A1 * | 9/2013 | Matsushita | 49/352 |

* cited by examiner (a)

(b)

(a)

(b)

(c)

(d)

SEAL STRUCTURE FOR FIXING WINDOW REGULATOR TO INNER PANEL OF VEHICLE

TECHNICAL FIELD

The present invention relates to a seal structure of a vehicle door being capable of preventing rain water and the like from entering the inside of a vehicle through a clearance between an engagement portion of a window regulator and an engagement hole portion of an inner panel.

BACKGROUND OF THE INVENTION

Conventionally, in order to lift and lower a window glass of a vehicle, a lifting and lowering device for a window glass having a drive member provided at a lower end of a guide rail has been used as described in JP 2007-177421 A. In the lifting and lowering device for a window glass described in JP 2007-177421 A, an upper end portion of the guide rail is fixed to a position above a center opening formed at the center of an inner panel of a vehicle door by bolting or the like, and a lower end portion is fixed to a position below the center opening by bolting or the like through a drive member having an electric motor.

As shown in JP 2007-177421 A, a window regulator is fixed to an inner panel of a vehicle by a fastening member such as bolts and nuts. In this case, it is necessary to carry out fastening with a fastening member after positioning of a through hole for inserting the fastening member provided on the inner panel and a through hole for inserting the fastening member provided on the window regulator, but it is difficult to insert the fastening member into the through holes for inserting the fastening member while carrying out the positioning. Accordingly, there is a window regulator, in which an engagement hole portion is provided in an inner panel separately from a through hole for inserting a fastening member, and an engagement portion is provided on the window regulator for positioning of the window regulator by engaging the engagement portion with the engagement hole portion, thereby making easy the inserting process of the fastening member into the through holes for inserting a fastening member.

However, such engagement of the engagement hole portion with the engagement portion differs from engagement using a fastening member such as bolts and nuts, in which a fixed state is provided without a clearance. In the engagement of the engagement hole portion with the engagement portion, in order to make the engagement of the engagement hole portion with the engagement portion easy, the dimensions thereof are set so as to give a predetermined clearance when engaged, and therefore, there is a possibility of rain water entering the inside of a vehicle through the clearance.

It is an object of the present invention to provide a seal structure of a vehicle door being capable of preventing rain water and the like from entering the inside of a vehicle through a clearance between an engagement portion of a window regulator and an engagement hole portion of an inner panel.

SUMMARY OF THE INVENTION

The seal structure of the present invention is a seal structure for fixing a window regulator to an inner panel of a vehicle, comprising the inner panel provided with an engagement hole portion and the window regulator and the window regulator comprises a carrier plate to be connected to a window glass of a vehicle, a guide rail for guiding the carrier plate to upward and downward in moving of the carrier plate, an orientation changing member provided at one end of the guide rail, a drive member and a wire wound around the carrier plate and the drive member, an engagement portion being slidable with respect to the inner panel and engaging with the engagement hole portion, a sealing member provided around the engagement portion, and a seal supporting portion holding the sealing member between the seal supporting portion and a portion of the inner panel surrounding the engagement hole portion, when the engagement portion is engaged with the engagement hole.

It is preferable that the above-mentioned orientation changing member is provided with a rotating shaft portion engaged rotatably with respect to the inner panel, the drive member is provided at another end of the guide rail, and the engagement portion is provided on the drive member.

Further, it is preferable that the above-mentioned engagement portion is used for temporarily holding the drive member on the inner panel.

According to the seal structure of the present invention, rain water and the like can be prevented from entering the inside of a vehicle through a clearance between an engagement portion of a window regulator and an engagement hole of an inner panel.

BRIEF DESCRIPTION OF THE DRAWINGS

FIG. 6(*b*) is a cross-sectional view taken along a vertical line passing in a longitudinal direction through the engagement portion and the casing shown in FIG. 6(*a*) for explaining the engagement portion and the sealing member provided around the engagement portion which are used on the seal structure of the present invention.

FIG. 7(*b*) is a side view of the sealing member used on the seal structure of the present invention.

FIG. 7(*c*) is a cross-sectional view of Y-Y line of FIG. 7(*a*).

FIG. 7(*d*) is a cross-sectional view of Z-Z line of FIG. 7(*a*).

DETAILED DESCRIPTION

The seal structure of the present invention is explained below in detail with reference to the attached drawings.

First, the window regulator provided with the seal structure of the present invention is explained with reference to FIG. 1.

Figure 1:
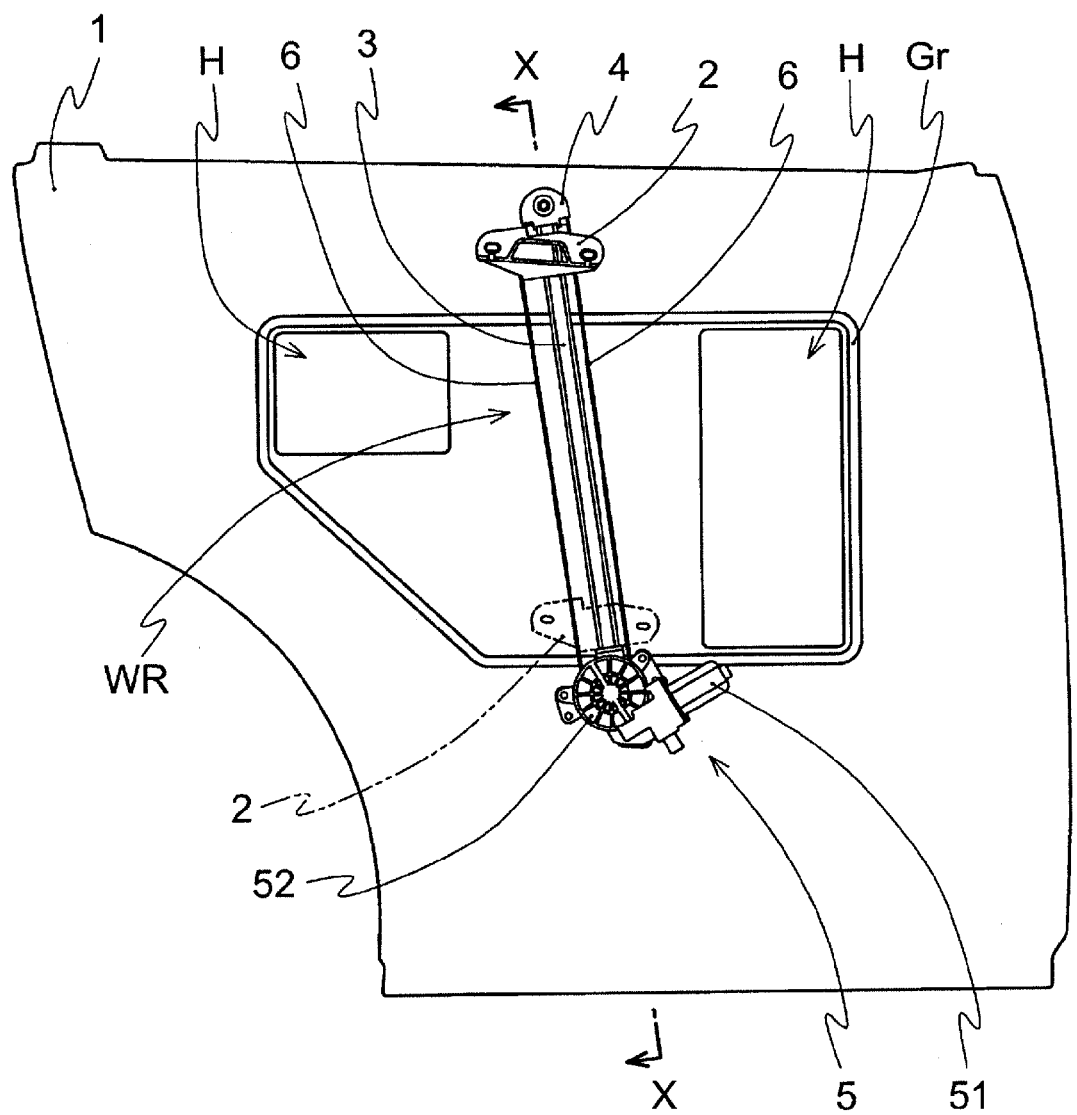
FIG. 1 is a view illustrating the window regulator provided with the seal structure of the present invention in a state of being fixed to the engagement hole portion of the inner panel of a vehicle.

As shown in FIG. 1, the window regulator WR is fixed to an inner panel 1 of a vehicle. The inner panel 1 of a vehicle is arranged inside a vehicle door and is fixed to an outer panel OP provided at an exterior side of a vehicle. Also, a lining L (See FIG. 2) is provided at an interior side of the inner panel 1. A plurality of electric parts (not shown) is provided between the inner panel 1 and the lining L. As shown in FIG. 1, service holes H are formed on the inner panel 1 for maintenance and inspection of the inside of a vehicle door (Two service holes H are formed in FIG. 1), and in order to prevent rain water and the like from entering the inside of a vehicle, the service holes are closed with a known water-proof sheet Sc (See FIG. 2).

Figure 2:
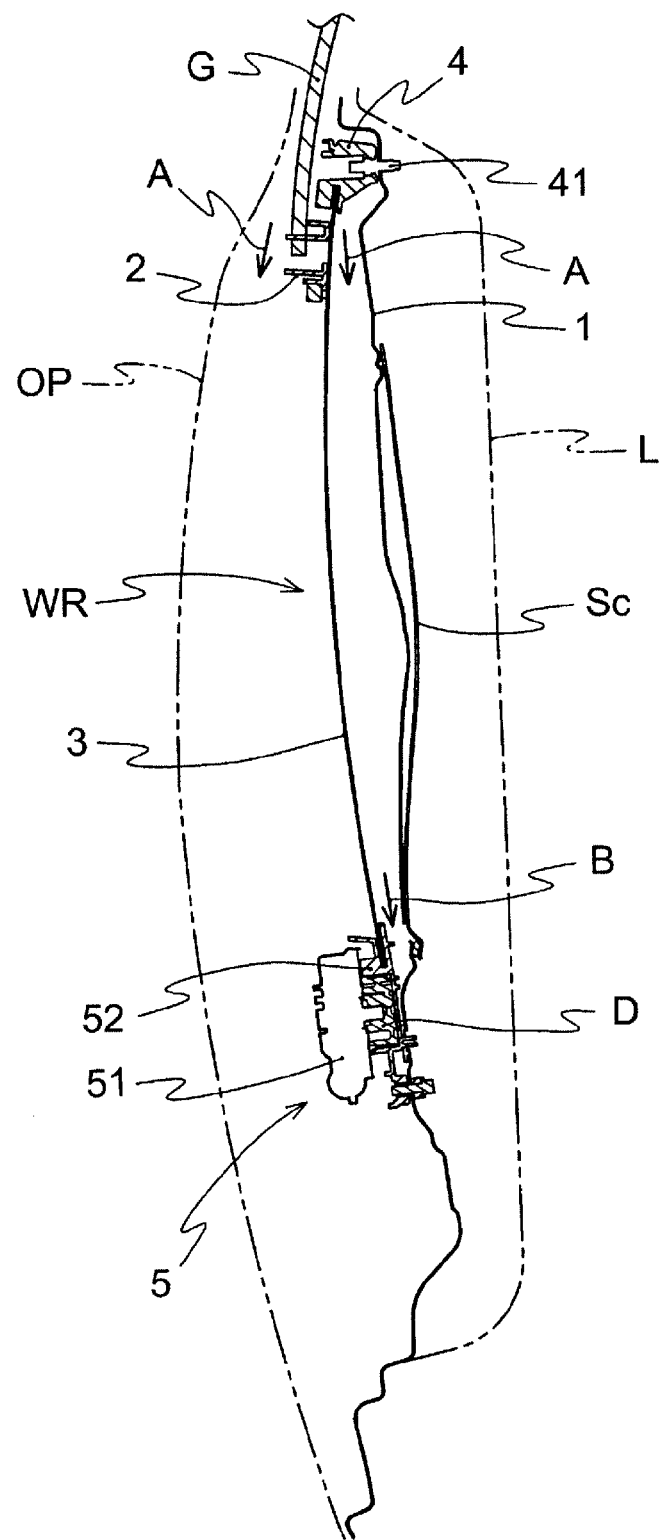
FIG. 2 is a cross-sectional view of X-X line of FIG. 1.
Figure 3:
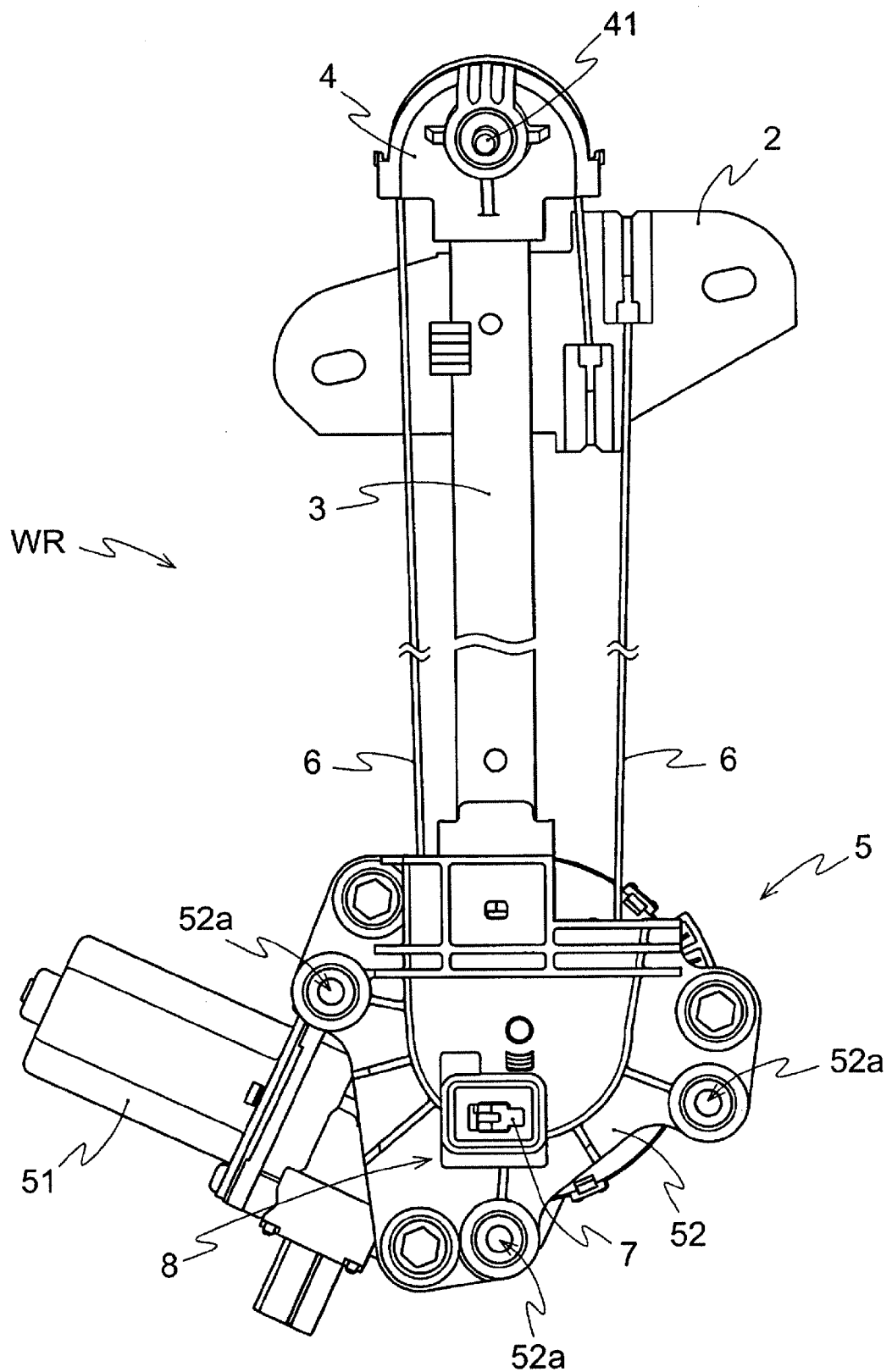
FIG. 3 is a view illustrating one embodiment of the window regulator provided with the seal structure of the present invention.

As shown in FIG. 2, the window regulator WR is fixed to an exterior side of the inner panel 1, and the window regulator WR moves upward and downward in a space between the inner panel 1 and the outer panel OP. As shown in FIGS. 2 and 3, the window regulator WR comprises a carrier plate 2 to be connected to the window glass G of a vehicle, a guide rail 3 for guiding the carrier plate 2 upward and downward in moving of the carrier plate 2, an orientation changing member 4 provided at one end of the guide rail 3, a drive member 5 and a wire or wires 6 wound around the carrier plate 2 and the drive member 5.

The carrier plate 2 moves up and down along the guide rail 3 provided in a vertical direction inside a vehicle door, and reciprocates between the top dead center shown by a continuous line and the bottom dead center shown by a two-dot chain line in FIG. 1 to allow the window glass G supported by the carrier plate 2 to move upward and downward. The drive member 5 is, as shown in FIG. 3, provided with a drive source 51 such as an electric motor, a drum D (See FIG. 2) which is connected to the drive source 51 and driven by the drive source 51 and winds the wire 6, and a casing 52 for accommodating the drum D. As shown in FIG. 3, on the casing 52, a plurality of insertion through holes 52a for inserting fixing means (not shown) such as bolts is formed in order to fasten the casing 52 with the inner panel 1.

Further, a protruded portion 41 to be inserted through the inner panel 1 is provided on the orientation changing member 4 as shown in FIGS. 2 and 3. While in the embodiment shown in FIGS. 2 and 3, the protruded portion 41 is shown as a bolt-like member having external thread formed on its outer periphery, the structure of the protruded portion 41 is not particularly limited as far as it can be inserted through the inner panel 1 and fixed to the inner panel 1 by a known fixing method such as caulking.

In addition, in the embodiment shown in FIGS. 2 and 3, the orientation changing member 4 itself does not rotate, and a guide groove for changing an orientation of the wire 6 is formed thereon. The orientation changing member 4 is not limited particularly as far as it can change an orientation of the wire 6. The orientation changing member 4 may be a pulley which rotates around its axis and a bolt-like member protruding in a direction vertical to and away from an end face of the pulley can be provided on a member for covering the pulley.

In this embodiment, when the window regulator WR is finally mounted on the inner panel 1, the upper side and the lower side of the window regulator WR are mounted on the inner panel 1, respectively. It should be noted that in the embodiment shown in FIGS. 2 and 3, only one protruded portion 41 of the orientation changing member 4 is illustrated, but two or more protruded portions 41 may be provided to fix the upper side of the window regulator WR.

In this embodiment, the drive member 5 is provided at the lower end side of the guide rail 3 of the window regulator WR, but it is not necessarily provided at the lower end side of the guide rail 3. Alternatively, the orientation changing member 4 may be provided also on the lower end side of the guide rail 3, and the drive member 5 may be provided at a position lateral to the center of the guide rail 3.

Next, the seal structure S for fixing the window regulator WR to the inner panel 1 of a vehicle is explained with reference to FIGS. 4 to 8.

Figure 4:
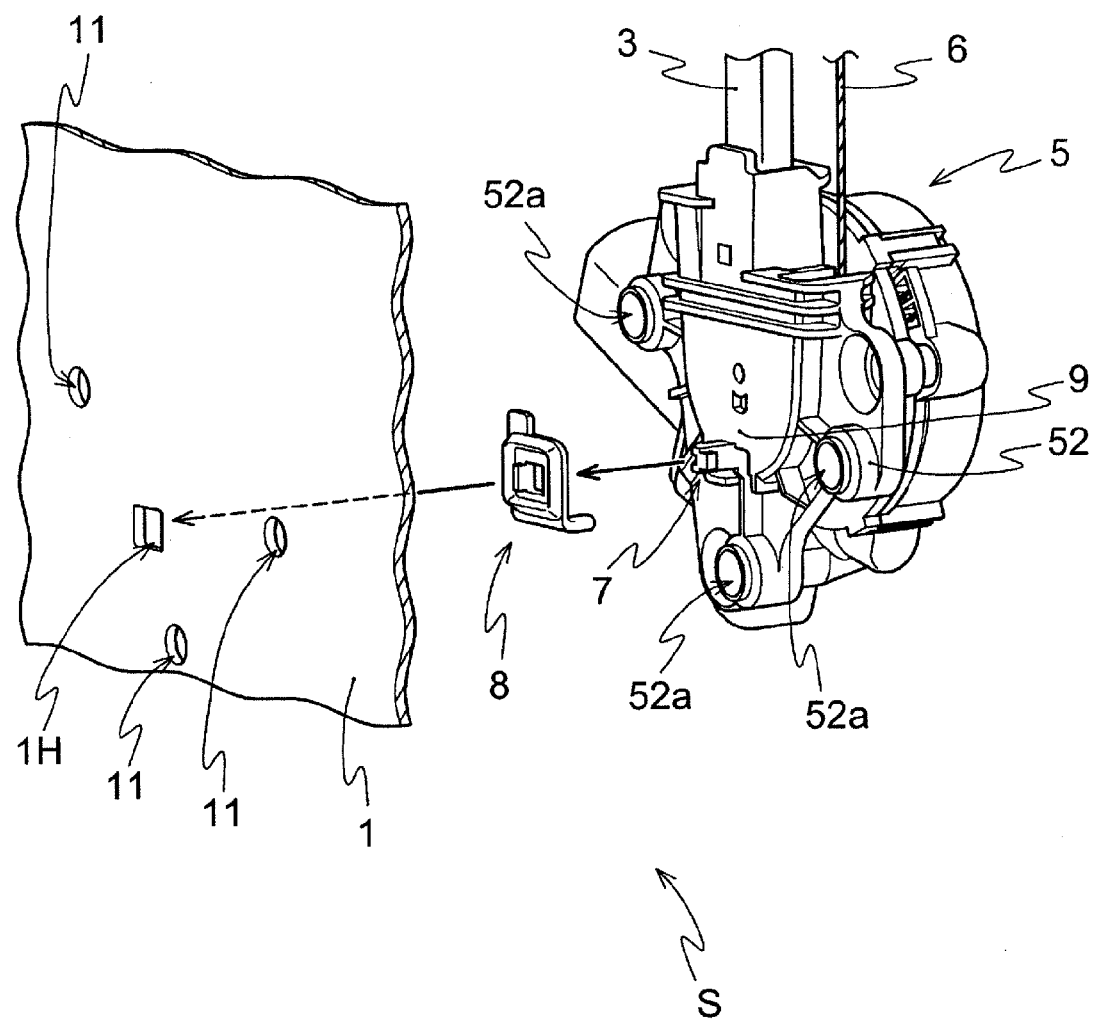
FIG. 4 is a perspective view for explaining the seal structure of the present invention.

As shown in FIG. 4, in the seal structure S of the present invention, the inner panel 1 is provided with an engagement hole portion 1H, and the window regulator WR further comprises an engagement portion 7 being slidable with respect to the inner panel 1 and engaging with the engagement hole portion 1H, a sealing member 8 provided around the engagement portion 7, and a seal supporting portion 9 for holding the sealing member 8 between the seal supporting portion 9 and a portion of the inner panel 1 surrounding the engagement hole portion 1H when engaging the engagement portion 7 with the engagement hole portion 1H.

Figure 5:
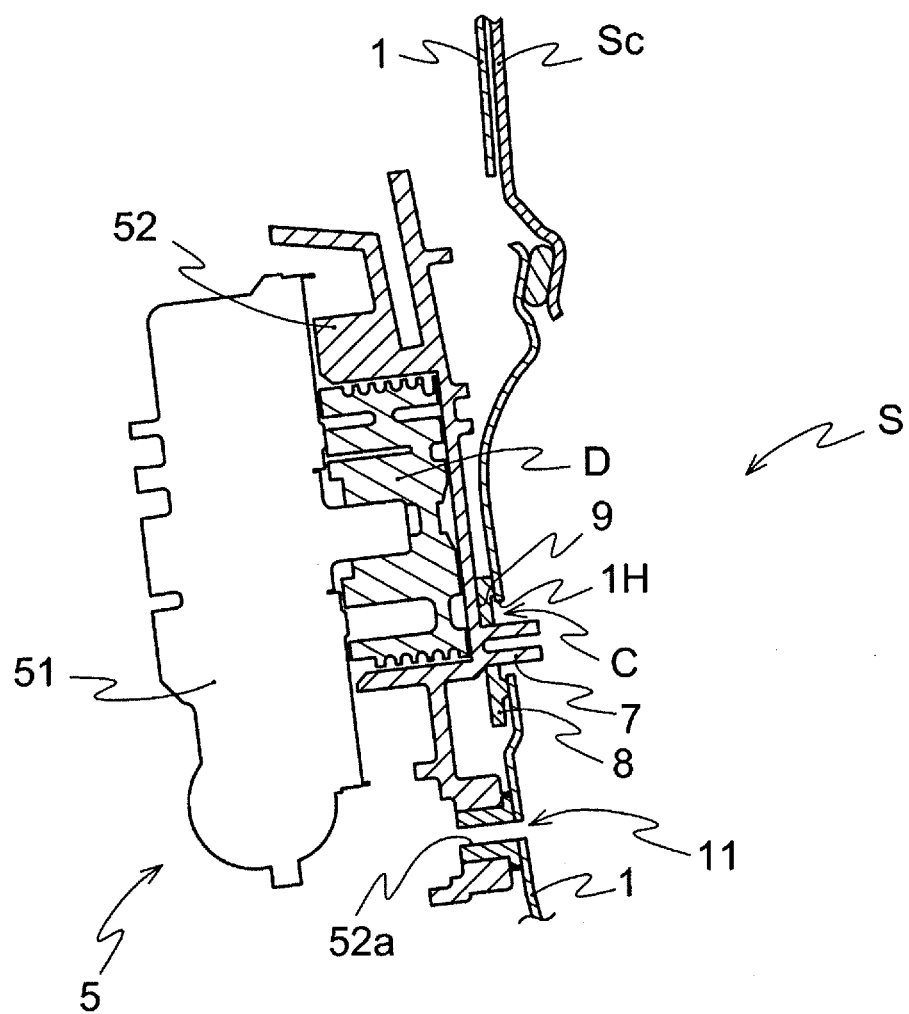
FIG. 5 is a cross-sectional view of X-X line of FIG. 1 illustrating the sealing member used on the seal structure of the present invention in a state of being held between the inner panel and the seal supporting portion.

In order to engage the engagement portion 7, the engagement hole portion 1H is configured such that the opening area of the engagement hole portion 1H is large enough for enabling the end of the engagement portion 7 to be inserted therethrough, and that when the engagement portion 7 is engaged with the engagement hole portion 1H, a clearance C is formed between the engagement portion 7 and the engagement hole portion 1H as shown in FIG. 5. Further, the sealing member 8 is large enough so as to be able to cover the whole opening area of the engagement hole portion 1H. In the embodiment shown in FIGS. 4 to 8, while a rectangular opening is formed as the engagement hole portion 1H, the engagement hole portion 1H may be in a circular shape or may be in the form of a keyhole shape such that a slit-like hole is further provided in a rectangular or circular opening as far as the engagement portion 7 can be engaged easily with the engagement hole portion 1H.

Figure 6:
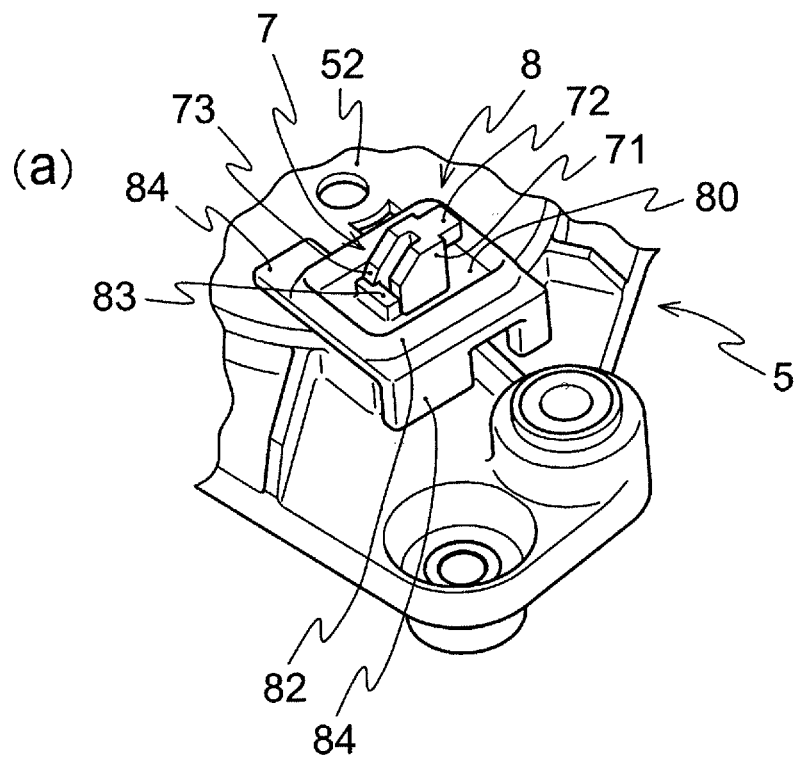
FIG. 6(*a*) is a perspective view for explaining the engagement portion and the sealing member provided around the engagement portion which are used on the seal structure of the present invention.
Figure 6:
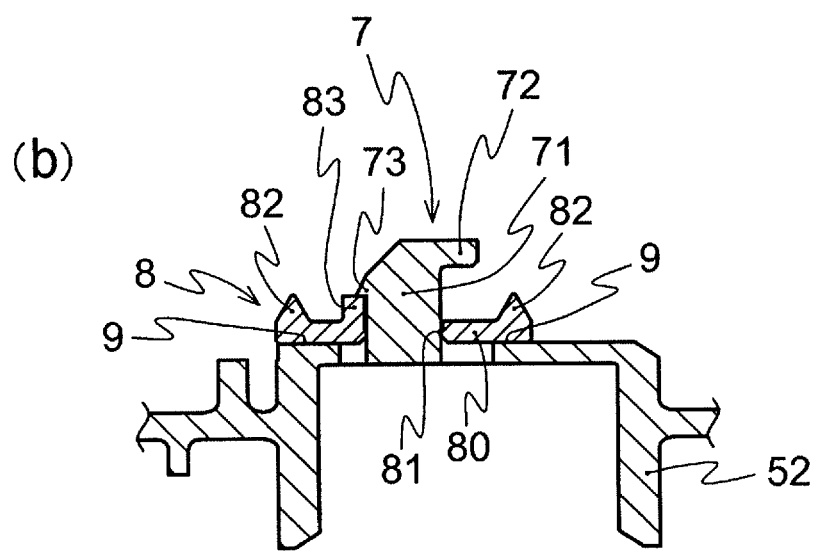
Figure 7:
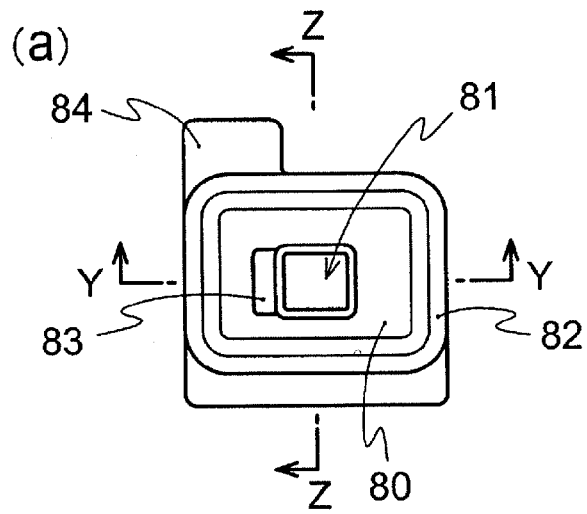
FIG. 7(*a*) is a top view of the sealing member used on the seal structure of the present invention.
Figure 7:
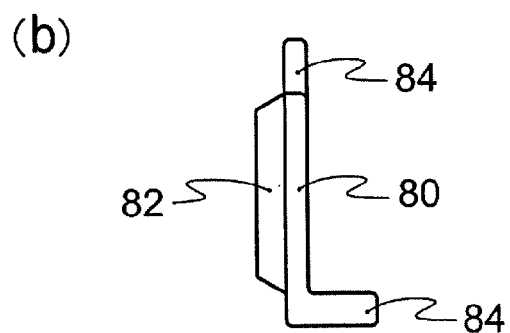
Figure 7:
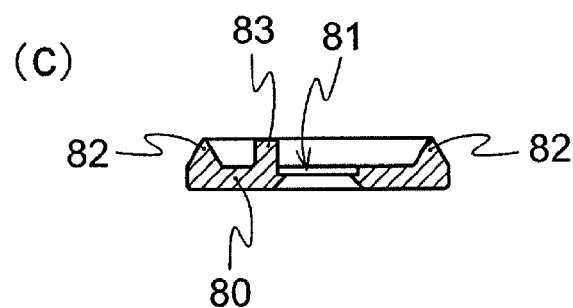
Figure 7:
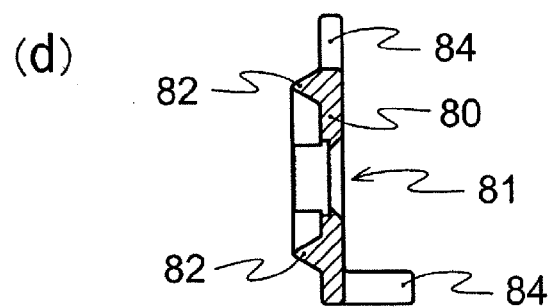

The engagement portion 7 "being slidable with respect to the inner panel" means that connection not forming the clearance C between the inner panel 1 and the engagement portion 7, for example, connection by screwing is excluded and that connection for enabling the engagement portion 7 to be slid with respect to the surface of the inner panel 1 or to be slid in a thickness direction of the inner panel 1 is included. In the embodiment shown in FIGS. 4 to 8, as shown in FIGS. 6(a) and 6(b), the engagement portion 7 comprises an erected portion 71 extending vertically to the seal supporting portion 9 formed around the engagement portion 7 and a claw portion 72 bent vertically to the erected portion 71. The engagement portion 7 is configured such that after engagement with the engagement hole portion 1H, the erected portion 71 slides with respect to the surface of the inner panel 1 to be engaged with the engagement hole portion 1H, and the claw portion 72 engages with the surface of the inner panel 1 so that the engagement portion 7 should not be pulled out of the engagement hole portion 1H.

In addition, in the embodiment shown in FIGS. 4 to 8, though the engagement portion 7 is provided on the drive member 5, it is not necessarily provided on the drive member 5. The engagement portion 7 may be provided on any member of the window regulator WR, which can engage the window regulator WR with the inner panel 1. For example, it is possible to provide the drive member 5 at a position lateral to the center of the guide rail 3, to provide the orientation changing members 4 on the upper end side and lower end side of the guide rail 3 and to form the engagement portion 7 on the orientation changing member 4 at the lower end side. Alternatively, it is possible to provide a bracket on the window regulator WR to form the engagement portion 7 on the bracket. Therefore, in the embodiment shown in FIGS. 4 to 8, though the seal supporting portion 9 is provided at a position around the engagement portion 7 of the drive member 5, the position where the seal supporting portion 9 is provided is not limited to the drive member 5, and may be provided on other member. Further, it is sufficient that the seal supporting portion 9 may be configured such that when the engagement portion 7 is engaged with the engagement hole portion 1H, the sealing member 8 can be held between the seal supporting portion 9 and the portion of the inner panel 1 surrounding the engagement hole portion 1H. Furthermore, the seal supporting portion 9 is not necessarily provided on the same member on which the engagement portion 7 is provided, and a different member other than the member on which the engagement portion 7 is provided can be used as the seal supporting portion 9.

In addition, as shown in FIGS. 2 and 3, it is possible to make the engagement of the engagement portion 7 with the engagement hole portion 1H easy by adopting a configuration such that the orientation changing member 4 comprises the protruded portion 41 acting as a rotating shaft portion engaged rotatably with respect to the inner panel 1, the drive member 5 is provided at another end of the guide rail 3 (another end of the guide rail 3 when the orientation changing member 4 is provided at one end of the guide rail 3, i.e. the lower end in FIGS. 2 and 3), and the engagement portion 7 is provided on the drive member 5. Namely, before completely fixing the protruded portion 41 to the inner panel 1, the protruded portion 41 acts as a rotating shaft portion being rotatable with respect to the inner panel 1. Therefore, the window regulator WR can be easily mounted on the inner panel 1 by turning the whole window regulator WR around the protruded portion 41 acting as a rotating shaft portion after inserting the engagement portion 7 provided at the lower end of the guide rail 3 into the engagement hole portion 1H. Further, in the case where the protruded portion 41 is a rotating shaft portion engaged rotatably with respect to the inner panel 1 as mentioned above, the engagement portion 7 can be used for temporarily holding the drive member 5 on the inner panel 1. In this case, by protruding the claw portion 72 of the engagement portion 7 in a substantially vertical direction to the guide rail 3 (turning direction of the guide rail 3), and only by inserting the claw portion 72 of the engagement portion 7 into the engagement hole portion 1H, the drive member 5 turns like a pendulum around the protruded portion 41 acting as a rotating shaft portion, and the engagement portion 7 is engaged with an edge of the engagement hole portion 1H and stops there. Therefore, the drive member 5 can be temporarily held only by inserting the engagement portion 7 into the engagement hole portion 1H by hand and then releasing a hand from the window regulator WR.

The sealing member 8 provided around the engagement portion 7 is made of an elastic material such as rubber and mounted around the engagement portion 7. The sealing member 8 may be configured so as to be separable from the engagement portion 7 as shown in FIG. 4 or to be formed integrally with the engagement portion 7. As shown in FIGS. 6(b), 7(a), 7(c) and 7(d), the sealing member 8 is provided with an insertion opening 81 at the center of a flat base body 80 for inserting the engagement portion 7 therethrough. As shown in FIGS. 6(a), 6(b), and 7(a) to 7(d), a sealing portion 82 protruded from the base body 80 in the form of a frame is formed around the insertion opening 81 so as to surround the engagement portion 7 inserted into the insertion opening 81. In addition, as shown in FIGS. 6(a) and 6(b), a hooked portion 83 standing in the same direction as the sealing portion 82 is formed at an edge of the insertion opening 81. When the engagement portion 7 is inserted into the insertion opening 81 of the sealing member 8, a hooking portion 73 protruded in the form of hook from the erected portion 71 of the engagement portion 7 is hooked with the hooked portion 83 to prevent the sealing member 8 from coming off from the engagement portion 7. Further, in order to mount the sealing member 8 stably, as shown in FIGS. 6(a), 7(a) and 7(b), a guiding portion 84 can be formed depending on a shape of the seal supporting portion 9, such as the shape of the drive member 5 to which the sealing member 8 is fixed. In the embodiment shown in FIGS. 6(a), 7(a) and 7(b), the guiding portion 84 is provided in a direction horizontal or vertical to the base body 80. In addition, the shape of the sealing member 8 shown in FIGS. 6(a), 6(b), and 7(a) to 7(d) is merely an example and is not limited to the shape shown therein. The shape of the sealing member 8 may be one which enables a clearance between the engagement portion 7 and the engagement hole portion 1H to be sealed by the sealing member 8 being provided around the engagement portion 7 and being held between the inner panel 1 and the seal supporting portion 9.

Starting from a state as shown in FIG. 4, by mounting the sealing member 8 to the engagement portion 7 and engaging the engagement portion 7 in a state as shown in FIGS. 6(a) and 6(b) with the engagement hole portion 1H of the inner panel 1, as shown in FIG. 5, the whole opening of the engagement hole portion 1H is covered with the sealing portion 82 of the sealing member 8, and when assembling the window regulator WR on the inner panel 1, the sealing member 8 is held by the portion of the inner panel 1 surrounding the engagement hole portion 1H and the seal supporting portion 9. Thereby, the sealing portion 82 is subject to elastic deformation and the engagement hole portion 1H can be sealed. Therefore, even if water entering from the inner panel 1 and the outer panel OP as shown by an arrow A in FIG. 2 flows around the engaged part between the engagement portion 7 and the engagement hole portion 1H as shown by an arrow B, the water is prevented from entering the interior side (at the side of the lining L) of the inner panel 1 by the sealing portion 82 of the sealing member 8. As mentioned above, the window regulator WR can be easily mounted and temporarily held on the inner panel 1 by sliding the window regulator WR with respect to the inner panel, and furthermore, rain water and the like can be prevented from entering the inside of a vehicle through a clearance between the engagement portion 7 of the window regulator WR and the engagement hole portion 1H of the inner panel 1.

Further, as shown in FIG. 4, window regulator mounting holes 11, on which a fixing means such as bolts for mounting the window regulator WR on the inner panel 1 is mounted through the insertion through hole 52a of the drive member 5, are formed around the engagement hole portion 1H. By forming the window regulator mounting holes 11 around the engagement hole portion 1H and carrying out the fixing using the fixing means such as bolts and nuts, the sealing member 8 can be held more rigidly between the seal supporting portion 9 and the inner panel 1, and entering of water such as rain water can be further prevented.

Furthermore, in the case of forming the service holes H on the inner panel 1 and providing the water-proof sheet Sc (See FIG. 2) for preventing water from entering the interior side of the inner panel 1, if there is no sealing member 8, water enters the interior side of the inner panel 1 from the clearance between the engagement hole portion 1H of the inner panel 1 and the engagement portion 7 of the window regulator WR. Therefore, if there is no sealing member 8, the water-proof sheet Sc must be provided up to the position of a groove Gr shown by the two-dot chain line in FIG. 8. In this case, an adhesive or the like for sticking the water-proof sheet Sc is filled in the groove Gr formed on the inner panel 1 and the water-proof sheet Sc is stuck. In the case of sticking the water-proof sheet Sc on the inner panel 1, water which has entered the space between the inner panel 1 and the water-proof sheet Sc is discharged from a discharge port 12 (illustrated in a rectangular form in FIG. 8) formed on the inner panel 1. Therefore, if there is no sealing member 8, the water-proof sheet Sc must be spread further widely below the engagement hole portion 1H as shown by the two dot chain line in FIG. 8, which results in increased size of the water-proof sheet Sc. Further, the groove Gr being a seal line for sticking the water-proof sheet Sc must be formed so as to pass below the engagement hole portion 1H, and as a result, the shape of the inner panel 1 becomes complicated and the formability is decreased.

Figure 8:
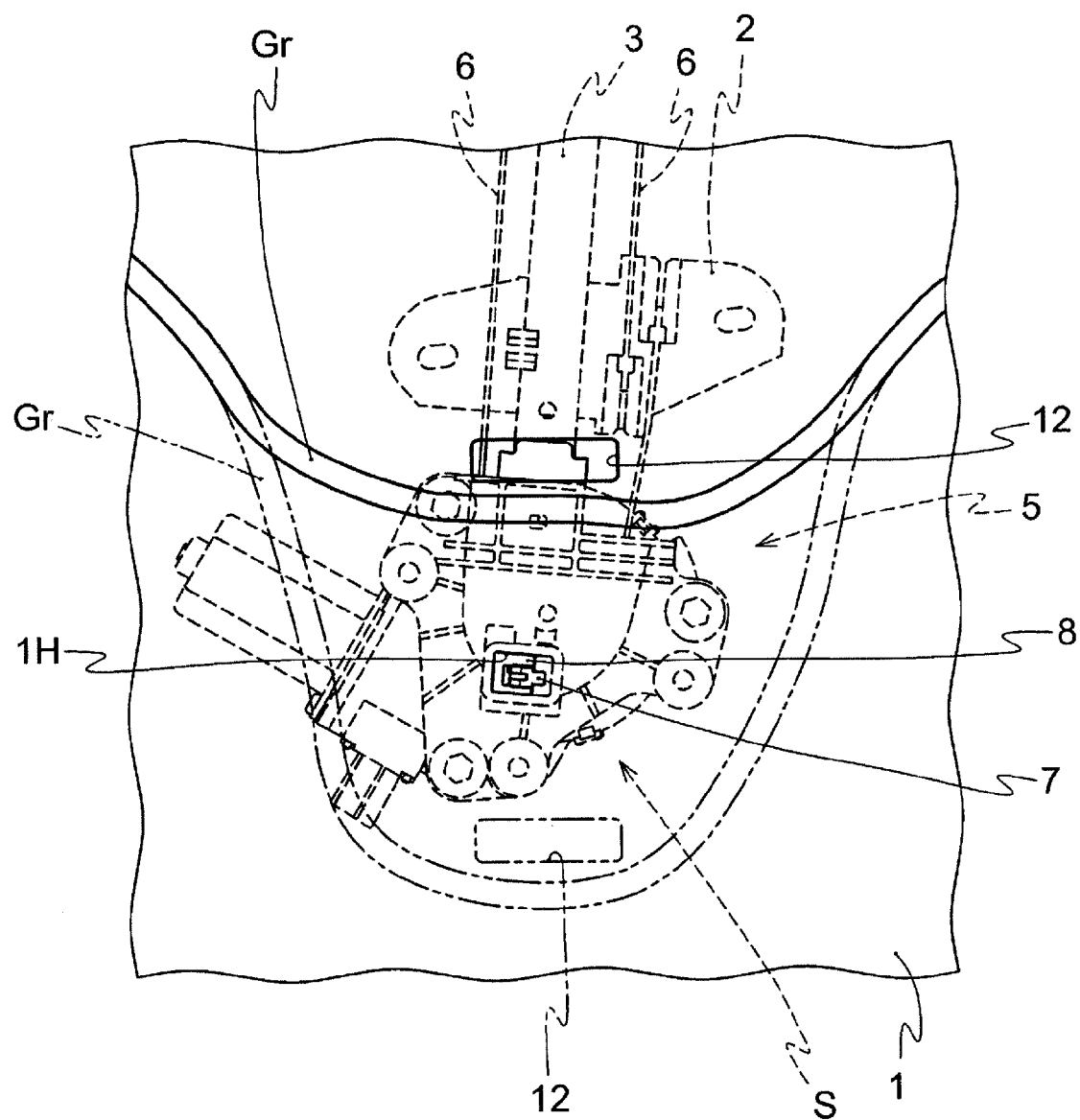
FIG. 8 is a view illustrating grooves which will be seal lines of a water-proof sheet on the inner panel in the case of using the seal structure of the present invention.

On the other hand, by providing the sealing member 8, as shown in FIG. 8 by continuous line, the groove Gr being a seal line for sticking the water-proof sheet Sc can be formed above the engagement hole portion 1H of the inner panel 1, which can make the shape of the inner panel 1 simple and formability is improved.

DESCRIPTION OF THE REFERENCE NUMERALS

1: Inner Panel
11: Window Regulator Mounting Hole
1H: Engagement Hole Portion
12: Discharge Port
2: Carrier Plate
3: Guide Rail
4: Orientation Changing Member
41: Protruded Portion
5: Drive Member
51: Drive Source
52: Casing
52a: Insertion Through Hole
6: Wire
7: Engagement Portion
71: Erected Portion
72: Claw Portion
73: Engaging Portion
8: Sealing Member
80: Base body
81: Insertion Opening
82: Sealing Portion
83: Engaged Portion
84: Guiding Portion
9: Seal Supporting Portion
C: Clearance
D: Drum
G: Window Glass
Gr: Groove
H: Service Hole
L: Lining
OP: Outer Panel
S: Seal Structure
Sc: Water Proof Sheet
WR: Window Regulator

What is claimed is:

1. A seal structure for fixing a window regulator to an inner panel of a vehicle, comprising the inner panel provided with an engagement hole portion and the window regulator;
the window regulator comprising a carrier plate to be connected to a window glass of the vehicle,
a guide rail for guiding the carrier plate upward and downward during movement of the carrier plate,
an orientation changing member provided at one end of the guide rail,
a drive member,
a wire wound around the carrier plate and the drive member,
an engagement portion being slidable with respect to the inner panel and engaging with the engagement hole portion,
a sealing member provided around the engagement portion,
a seal supporting portion holding the sealing member between the seal supporting portion and a portion of the inner panel surrounding the engagement hole portion, when the engagement portion is engaged with the engagement hole portion, and
a hooked portion provided in the sealing member, the hooked portion being engaged with the engagement portion,
wherein the engagement hole portion is entirely covered with the sealing member and the engagement portion when the engagement portion is engaged with the engagement hole portion, wherein the seal supporting portion is provided at the drive member, the sealing member is entirely interposed between the drive member and the inner panel and in contact with a surface of the inner panel, the engagement portion is penetrated through the engagement hole portion to engage with a surface of the inner panel opposite the surface of the inner panel which contacts the sealing member.

2. The seal structure of claim 1, wherein
the orientation changing member is provided with a rotating shaft portion engaged rotatably with respect to the inner panel,
the drive member is provided at another end of the guide rail, and the engagement portion is provided on the drive member.

3. The seal structure of claim 2, wherein the engagement portion is used for temporarily holding the drive member on the inner panel.

4. The seal structure of claim 1, wherein the drive member comprises a drive source, a drum and a casing,
the drum is connected to the drive source and driven to wind the wire,
an accommodating portion for accommodating the drum is formed in the casing,
the window regulator is mounted to the inner panel so that an opposite side of the accommodating portion to a side where the drive source is arranged is toward the inner panel, and
the engagement portion is provided to the opposite side.

5. The seal structure of claim 1, wherein the engagement portion comprises an erected portion and a claw portion,
the erected portion is formed so as to extend vertically from the seal supporting portion,
the claw portion is formed at a tip side of the erected portion,
the sealing member is provided with a base body and an insertion opening,
the base body is supported by the seal supporting portion,
the insertion opening is provided at a center of the base body,
the engagement portion is inserted into the insertion opening, and an edge portion forming the insertion opening of the base body contacts a periphery of a base end of the erected portion of the engagement portion.

6. The seal structure of claim 5, wherein the erected portion and the claw portion can be inserted into an opening of the engagement hole portion in a state that the hooked portion is engaged with the engagement portion.

7. The seal structure of claim 6, wherein when the erected portion and the claw portion are inserted into the engagement hole portion, the claw portion engages with a surface of the inner panel opposite to a surface of the inner panel which the window regulator is mounted, and the sealing member contacts with a portion of the inner panel surrounding the engagement hole portion on the surface of the inner panel to which the window regulator is mounted.

8. The seal structure of claim 5, wherein the hooked portion is formed so as to stand in a vertical direction with respect to the base body from at least a part of the edge portion, a hooking portion is formed so as to be protruded in the form of a hook from the erected portion of the engagement portion, and a tip of the hooked portion is connected to the hooking portion and the base body is connected to the seal supporting portion.

9. The seal structure of claim 1, wherein the engagement portion comprises an erected portion and a claw portion and an engagement is made by engaging the claw portion with the surface of the inner panel.

10. The seal structure of claim 1, wherein the sealing member is held between the seal supporting portion and the inner panel to be subject to elastic deformation, thereby sealing the engagement hole portion.

* * * * *